United States Patent Office 2,779,804
Patented Jan. 29, 1957

2,779,804

PROCESS FOR THE MANUFACTURE OF VINYL CHLORIDE FROM 1,2-DICHLOROETHANE AND ACETYLENE

Frederic Francois Albert Braconier, Plainevaux, and Jean Andre Robert Ovide Leon Godart, Tilff, Belgium, assignors to Societe Belge de l'Azote et des Produits Chimiques du Marly, Liege, Belgium, a company of Belgium No Drawing. Application October 26, 1954,
Serial No. 464,913

Claims priority, application Belgium November 3, 1953

4 Claims. (Cl. 260—656)

This invention relates to an improved process for the manufacture of vinyl chloride from dichlorethane and acetylene.

The production of vinyl chloride is known, both by the dehydrochlorinating pyrolysis, whether catalytic or not, of 1,2-dichlorethane, with liberation of hydrogen chloride and by the catalytic synthesis from acetylene with hydrogen chloride. The combination of these two methods for the preparation of vinyl chloride has been likewise already put into practice industrially, utilizing the hydrogen chloride which is liberated in the first process to carry out the second stage. Besides the possibility of using the hydrochloric acid which is a byproduct of the first process immediately in the manufacture of the vinyl chloride, the combined method has several additional technical advantages.

Taking into consideration the fact that the reaction of hydrogen chloride and acetylene, whereby vinyl chloride is produced, is highly exothermic, the temperature should be maintained at a level which is most favorable for the manufacture of vinyl chloride by providing for the absorption of the excess released heat. This may be accomplished by outside cooling which, owing to the highly exothermic character of the reaction, requires the employment of catalyst tubes with small cross-section. The heat absorption may also be carried out by adding to the mixture of reaction gases, acetylene and hydrogen chloride, other gases, which do not take part in the reaction itself, such as hydrogen, nitrogen, etc. These gases will, however, dilute the resulting reaction gas and render more difficult, and complicate, the vinyl chloride recovery from the pyrolysis.

By using the acetylene and hydrogen chloride reaction, the reaction mixture comprising hydrogen chloride and vinyl chloride derived from the pyrolysis of 1,2-dichlorethane, instead of hydrogen chloride from another source, and any other diluting gas, the hydrochloric acid which is the by-product of this pyrolysis, is rationally employed as the reagent, and the vinyl chloride acts as the heat regulator, performing this function very effectively, due to its considerable specific heat, as compared with that of other diluting gases. Furthermore, since the concentration of the vinyl chloride thus obtained is considerably increased, it may also be separated with more ease from the final reaction mixture.

Because of the dilution of the mixture of hydrogen chloride and acetylene with vinyl chloride from the dichlorethane pyrolysis stage, it is possible to use catalyst tubes with large cross-sections which, due to the exothermic character of the synthesis reaction, cannot be used in the reaction of hydrochloric acid with undiluted acetylene.

Nevertheless, along with these undeniable advantages, the combined method has the drawback that as the source of the hydrogen chloride for the vinyl chloride synthesis from acetylene a gaseous mixture is used which, since obtained through the usual processes for the pyrolysis of 1,2-dichlorethane, contains a considerable quantity of products that tend to poison the synthesis catalyst.

Actually, the pyrolysis, whether catalytic or not, as customarily practiced, with temperatures of more than 500° C., produces relatively large quantities of tars in the gaseous products of the pyrolysis.

In order to check and reduce the formation of these tars and of other products which are harmful to the synthesis catalyst, a specific catalyst is used, in accordance with this invention, for the pyrolysis, which enables this operation to be conducted at relatively low temperatures ranging from 350 to 450° C. rather than from 575 to 600° C. as employed in previously known processes.

An object of the invention is to produce vinyl chloride by the combined pyrolysis of 1,2-dichlorethane and synthesis of acetylene with hydrogen chloride, utilizing the hydrogen chloride produced in the pyrolysis reaction in the synthesis reaction.

Another object is to regulate the temperature of the reaction by utilizing the vinyl chloride produced in the pyrolysis reaction as a heat regulator for the synthesis reaction.

A further object is to check or reduce the formation of tars and other undesirable by-products.

The pyrolytic catalyst, in accordance with the invention, consists of activated carbon, impregnated with from 20 to 40% and preferably 30% by weight of barium chloride and from 0.30 to 0.70%, preferably 0.50%, of mercuric chloride.

Owing to the relatively low temperatures of the pyrolysis in which the catalyst operates, tar formation will be reduced to a minimum, actually, the gas which is discharged from the catalyst tube not containing more than about 0.07% by weight.

Furthermore, it has been established that with this catalyst the supply of 1,2-dichlorethane may be much greater, for example about 1 mol per liter of the catalyst per hour, as compared with 0.1 mol per liter of catalyst per hour.

The application of the combined process of the preparation of vinyl chloride, while using this specific pyrolytic catalyst is characterized by the following conditions and results:

Pure 1,2-dichlorethane is used, free of asymmetric dichlorethane and chlorides with more than 2 carbon and/or chlorine atoms in the molecule.

1,2-dichlorethane of this quality may be obtained by washing technical dichlorethane, with a 5% soda solution at room temperature, followed by washing with water and the final distillation of the washed product.

The 1,2-dichlorethane vapors are conducted at a temperature of from 350 to 450° C. through the pyrolytic furnace, provided with the specific catalyst of activated carbon, impregnated with barium and mercuric chlorides. The conversion rates amount to 80%. The unconverted 1,2-dichlorethane is recovered, the greater portion thereof by condensation, immediately after the pyrolytic operation, and the balance at the final vinyl chloride rectification, after the synthetic reaction. The two recovered portions of the 1,2-dichlorethane taken together, after first being washed and rectified, may be recycled, thus increasing to 95% the final yield of the conversion of 1,2-dichlorethane.

Before passing to the synthesis catalysis, the gases from the pyrolysis, which are divested of the major portion of the unconverted 1,2-dichlorethane and mainly consist of vinyl chloride and hydrogen chloride are still filtered, e. g., through a filter of porous porcelain or other similar device, in order to remove the very small quantities of tars that are entrained therein. Thereafter, a quantity of acetylene is added, in proportion to the hydrogen chloride gas content, and these pyrolytic gases, suitably preheated, are conducted, at a maximum temperature of 180° C., through the synthesizing tube, which is lined with a catalyst of activated carbon, impregnated with about 10% of mercuric chloride.

The acetylene which is used may be derived, either from calcium carbide or from the cracking of hydrocarbons, or from any other appropriate source, but it must be free of catalyst poisons such as arsines, phosphines, hydrogen sulfide, sulfur dioxide, diacetylene and other homologues of acetylene, etc.

The practical output attains easily 99.5% in the synthesis reaction. Consequently, the conversion rate of the 1,2-dichlorethane and acetylene in the combined process is very high. The process also avoids the formation of secondary products such as carbon dioxide, hydrogen, vinyl acetylene, divinyl acetylene, methane, etc., which are usually obtained in the synthesis from acetylene and hydrochloric gas.

The application of the improved process for the preparation of vinyl chloride from 1,2-dichlorethane and acetylene is illustrated by the following example.

*Example*

42 kgs. per hour of purified 1,2-dichloroethane, preheated in an ordinary steel tube to from 350 to 450° C., are conducted in the gaseous state into a pyrolytic furnace comprising tubes having a diameter of 50 mm., heated to 350–450° C. and containing a pyrolysis catalyst of activated carbon, impregnated with 30%, by weight, of $BaCl_2$ and 0.5% by weight, of $HgCl_2$. The gases coming from the pyrolytic furnace are cooled, by condensation of the unconverted 1,2-dichlorethane, the latter being recycled after having been washed and rectified.

After filtering the gases from the pyrolysis on a filter of porous porcelain, they are mixed with 7.4 cu. m. of purified acetylene, thereafter this mixture is preheated to about 100° C. and conducted through the synthesis furnace, which consists of ordinary steel tubes with a diameter of 50 mm. and is lined with a catalyst of activated carbon, impregnated with 10% of $HgCl_2$. The temperature of the catalysis usually maintains itself between 110° and 150° C. At the outlet from the synthesizing furnace, the gases are washed with water in order to eliminate the hydrochloric acid gas (approximately 2%) that had not taken part in the reaction, and thereafter these gases are compressed at 12 kgs. per sq. cm. By the rectification of the liquid mixture thus obtained, the acetylene and 1,2-dichloroethane are recovered and recycled and 1000 kg. per day of monomeric vinyl chloride are obtained, constituting $$99.99\% \ CH_2=CHCl,$$

with less than 0.005% polymers, and containing no acetylene, dichloroethane, hydrochloric acid, organic or mineral sulfur or iron. B. P.$=-13.9°$ C.,$\pm 0.1°$ C.

We claim:

1. A process for the manufacture of vinyl chloride which comprises passing 1,2-dichloroethane, over a pyrolysis catalyst comprising activated carbon impregnated with from 20 to 40% by weight of barium chloride and from 0.3 to 0.7% mercuric chloride at a temperature from 350° C. to 450° C. to produce a gaseous product comprising vinyl chloride and hydrogen chloride, adding acetylene to said product and passing the gaseous mixture thus formed over a catalyst comprising activated carbon impregnated with about 10% of mercuric chloride.

2. The process set forth in claim 1, in which the major portion of the unconverted 1,2-dichloroethane and tars present in said gaseous product are removed before the addition of acetylene to said gaseous product.

3. The process set forth in claim 1, in which the pyrolysis catalyst comprises activated carbon impregnated with about 30% barium chloride and about 0.5% mercuric chloride.

4. The process set forth in claim 1, in which the gaseous mixture is passed over the 10% mercuric chloride catalyst at a temperature from 110° to 150° C.

References Cited in the file of this patent

UNITED STATES PATENTS

| Re. 23,128 | Weiler | June 21, 1949 |
| 2,323,226 | Levine et al. | June 29, 1943 |

FOREIGN PATENTS

| 894,546 | France | May 10, 1943 |